(12) United States Patent
Kalra et al.

(10) Patent No.: US 11,201,759 B1
(45) Date of Patent: Dec. 14, 2021

(54) RECONFIGURABLE DUAL-RING NETWORK REDUNDANCY

(71) Applicant: Schweitzer Engineering Laboratories, Inc., Pullman, WA (US)

(72) Inventors: Amandeep Singh Kalra, Mill Creek, WA (US); David J. Dolezilek, Pullman, WA (US); Robert Meine, Boise, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 54 days.

(21) Appl. No.: 16/923,613

(22) Filed: Jul. 8, 2020

(51) Int. Cl.
  *H04L 12/24* (2006.01)
  *H04L 12/751* (2013.01)
  *H04L 12/437* (2006.01)
  *H04L 12/42* (2006.01)

(52) U.S. Cl.
  CPC ............ *H04L 12/437* (2013.01); *H04L 12/42* (2013.01); *H04L 2012/421* (2013.01)

(58) Field of Classification Search
  CPC .............................. H04L 12/437; H04L 12/42
  See application file for complete search history.

(56) References Cited

U.S. PATENT DOCUMENTS

| | | | |
|---|---|---|---|
| 5,663,950 A * | 9/1997 | Lee ....................... | H04L 12/437 340/2.7 |
| 7,142,504 B1 * | 11/2006 | Uzun .................... | H04L 12/437 370/224 |
| 7,424,220 B2 * | 9/2008 | Miyazaki ............ | H04J 14/0227 398/19 |
| 7,710,999 B2 | 5/2010 | Bolder | |
| 8,824,274 B1 | 9/2014 | Medved | |

(Continued)

FOREIGN PATENT DOCUMENTS

| CN | 203376828 | 1/2014 |
|---|---|---|
| CN | 106301952 | 1/2017 |

(Continued)

OTHER PUBLICATIONS

Ferrus, et al., "SDN/NFV-enabled satellite communications networks: Opportunities, scenarios and challenges." In: Physical Communication. Mar. 2016 (Mar. 2016).

(Continued)

*Primary Examiner* — Rasheed Gidado
(74) *Attorney, Agent, or Firm* — Justin K. Flanagan

(57) ABSTRACT

A network communication system may include intelligent electronic devices (IEDs) in a dual-ring communication network. A software-defined network (SDN) device may be programmed by a removable or disconnectable SDN controller to control the flow path of data packets to the IEDs in the dual-ring network. A first ring of the dual-ring communication network may be dedicated to high priority data packets, and a second ring of the dual-ring communication network may be dedicated to low priority data packets. The SDN device may implement various levels of redundancy depending on the number and location of link failures detected. A first level of redundancy may direct high priority data packets in the opposite direction, and a second level of redundancy may direct high priority data packets onto the other ring normally used for low priority data packets.

20 Claims, 7 Drawing Sheets

(56) References Cited

U.S. PATENT DOCUMENTS

| | | |
|---|---|---|
| 9,047,143 B2 | 6/2015 | Pruss et al. |
| 9,124,485 B2 | 9/2015 | Heron et al. |
| 9,137,140 B2 | 9/2015 | Tao et al. |
| 9,258,212 B2 | 2/2016 | Pfeifer et al. |
| 9,258,315 B2 | 2/2016 | Martin |
| 9,270,754 B2 | 2/2016 | Iyengar et al. |
| 9,276,827 B2 | 3/2016 | Voit et al. |
| 9,282,164 B2 | 3/2016 | Finn et al. |
| 9,330,156 B2 | 5/2016 | Satapathy |
| 9,356,871 B2 | 5/2016 | Medved et al. |
| 9,392,050 B2 | 7/2016 | Voit et al. |
| 9,467,536 B1 | 10/2016 | Kanekar et al. |
| 9,503,363 B2 | 11/2016 | Sivabalan et al. |
| 9,596,141 B2 | 3/2017 | McDowall |
| 10,560,390 B2 | 2/2020 | Gammel |
| 10,756,956 B2 | 8/2020 | Gammel |
| 10,812,392 B2 | 10/2020 | Gammel |
| 2002/0144156 A1 | 10/2002 | Copeland |
| 2003/0165119 A1* | 9/2003 | Hsu .................. H04L 45/00 370/258 |
| 2007/0280239 A1 | 12/2007 | Lund |
| 2008/0095059 A1 | 4/2008 | Chu |
| 2010/0097945 A1 | 4/2010 | Raftelis |
| 2010/0324845 A1 | 12/2010 | Spanier |
| 2012/0300615 A1 | 11/2012 | Kempf |
| 2012/0300859 A1 | 11/2012 | Chapman |
| 2012/0331534 A1 | 12/2012 | Smith |
| 2013/0121400 A1 | 5/2013 | Eliezer |
| 2013/0163475 A1 | 6/2013 | Beliveau |
| 2013/0311675 A1 | 11/2013 | Kancherla |
| 2014/0003422 A1 | 1/2014 | Mogul |
| 2014/0095685 A1 | 4/2014 | Cvijetic et al. |
| 2014/0109182 A1 | 4/2014 | Smith et al. |
| 2014/0280893 A1 | 9/2014 | Pfeifer et al. |
| 2014/0317248 A1 | 10/2014 | Holness et al. |
| 2014/0317256 A1 | 10/2014 | Jiang et al. |
| 2014/0317293 A1 | 10/2014 | Shatzkamer |
| 2014/0330944 A1 | 11/2014 | Dabbiere et al. |
| 2014/0365634 A1 | 12/2014 | Metz et al. |
| 2015/0281036 A1 | 10/2015 | Sun et al. |
| 2016/0014819 A1 | 1/2016 | Cona |
| 2016/0112269 A1 | 4/2016 | Singh et al. |
| 2016/0139939 A1 | 5/2016 | Bosch et al. |
| 2016/0142427 A1 | 5/2016 | de los Reyes et al. |
| 2016/0234234 A1 | 8/2016 | McGrew et al. |
| 2017/0019417 A1 | 1/2017 | McGrew et al. |
| 2017/0026349 A1 | 1/2017 | Smith et al. |
| 2017/0054626 A1 | 2/2017 | Sivabalan et al. |
| 2017/0070416 A1 | 3/2017 | Narayanan et al. |
| 2018/0176090 A1 | 6/2018 | Lessmann |
| 2018/0241621 A1 | 8/2018 | Vaishnavi |
| 2018/0287725 A1 | 10/2018 | Rabinovich |
| 2018/0287859 A1 | 10/2018 | Desigowda |

FOREIGN PATENT DOCUMENTS

| | | |
|---|---|---|
| EP | 3109128 | 12/2016 |
| WO | 2016206741 | 12/2016 |
| WO | 2017067578 | 4/2017 |

OTHER PUBLICATIONS

Mizrahi et al., Time-based Updates in OpenFlow: A Proposed Extension to the OpenFlow Protocol, Jul. 7, 2013, CCIT Report #835, Jul. 2013, EE Pub No. 1792, Technion, Israel (Year: 2013).

Gember et al., "Toward Software-Defined Middlebox Networking" In: Proceedings of the 11th ACM Workshop on Hot Topics in Networks. Oct. 30, 2012.

Molina et al., "Performance Enhancement of High-Availability Seamless Redundancy (HSR) Networks Using OpenFlow" IEEE, Nov. 30, 2015.

* cited by examiner

RECONFIGURABLE DUAL-RING NETWORK REDUNDANCY

TECHNICAL FIELD

This disclosure relates to intelligent electronic devices (IEDs) in a dual-ring network.

BRIEF DESCRIPTION OF THE DRAWINGS

The written disclosure herein describes illustrative embodiments that are nonlimiting and non-exhaustive. This disclosure references certain of such illustrative embodiments depicted in the figures described below.

DETAILED DESCRIPTION

Figure 1:
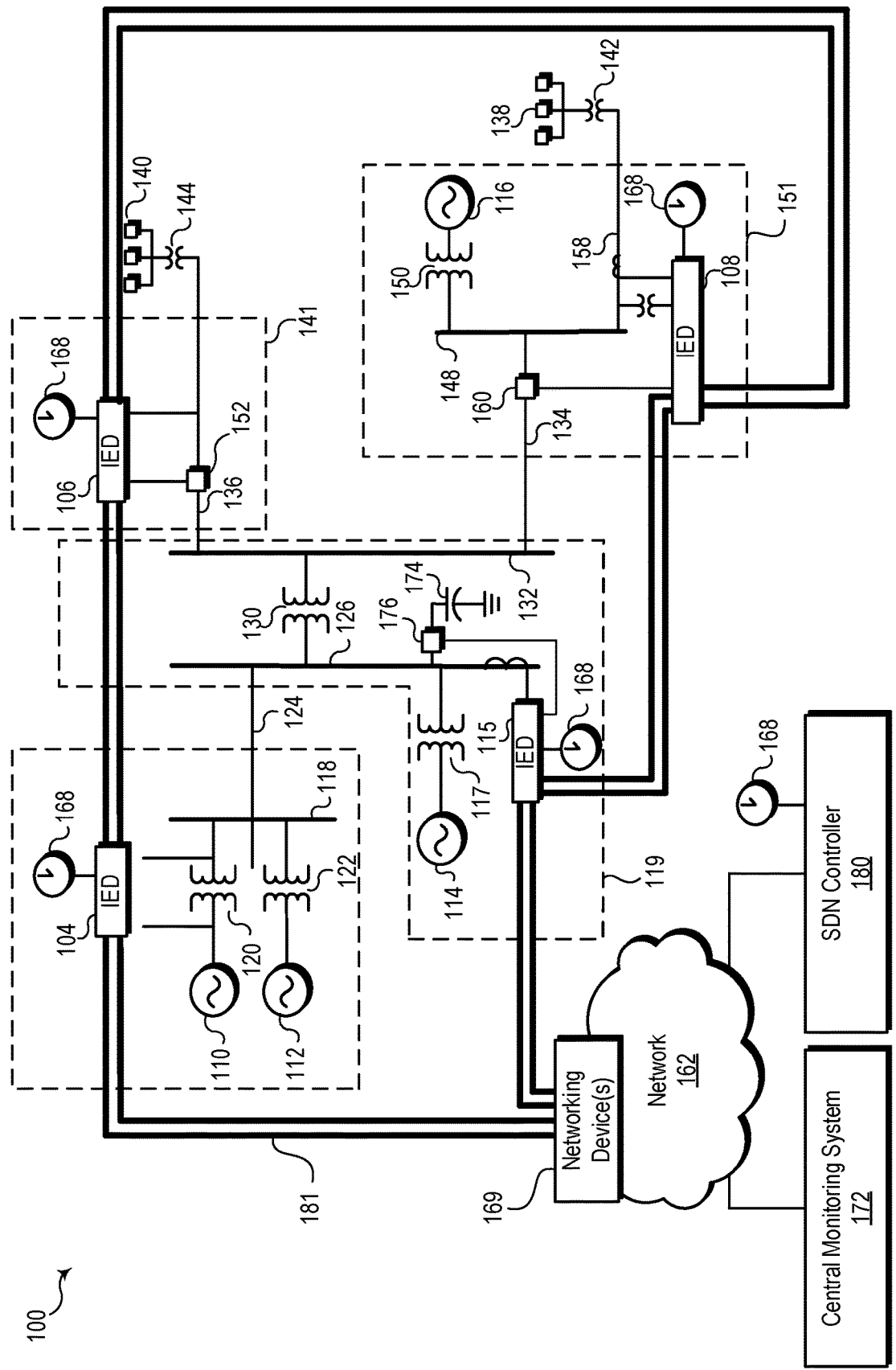
FIG. 1 illustrates an example of a simplified one-line diagram of an electric power transmission and distribution system in which various devices communicate via a dual-ring network configured via a software-defined network (SDN) controller.

Electric power distribution and transmission systems include various control, monitoring, and/or protection devices. A wide variety of communication and networking technologies may enable control, protection, and/or monitoring functions within an electric power distribution or transmission system. Communication and networking devices may, among other things, facilitate an exchange of information, the transmission of control instructions, and/or enable data acquisition.

Some electric power distribution and transmission systems may incorporate software-defined network (SDN) technologies to configure intelligent electronic devices (IEDs) and/or regulate communications on a network interconnecting data stores, control devices, monitoring devices, protective devices, human interfaces, and/or other electronic equipment.

In various embodiments, a dual-ring network may connect multiple IEDs and/or other networking devices. IEDs in the dual-ring network may communicate with SDN controllers, central monitoring systems, and/or other devices in a wide area network. The SDN controller may program the SDN behavior of the IEDs. For example, the IEDs may be programmed such that one ring of the dual-ring network is used for high priority data packets, and the other ring of the dual-ring network is used for low priority data packets.

In some embodiments, a network engineer or other information technology (IT) technician may use an SDN controller (e.g., a software application running on a general-purpose computer) to configure IEDs and/or other networking devices. IEDs are configured to control various aspects of the electric power distribution and transmission system, communicate with one another, and/or communicate with systems not included in the dual-ring network.

In various embodiments, IEDs are unaware of their location relative to other IEDs within the dual-ring network. An IED communicates with another IED, a network device, and/or a system external to the dual-ring network by transmitting the desired information and a recipient identifier to its neighboring IED or another networking device. Low priority communications may be transmitted on one ring of the dual-ring network, and high priority communications may be transmitted on the other ring of the dual-ring network.

In some embodiments, a user, such as a network engineer, may use an SDN controller to program an IED with specific operation profiles. Once programmed, the IED can continue to implement the defined operation profile even if the SDN controller is offline or disconnected. When changes are needed or desired, the network engineer can use the SDN controller to modify the operation profile or define a new operation profile for the IEDs. In some embodiments, the network engineer can use the SDN controller to modify the operation profile in real-time without disrupting data flow on the dual-ring network.

In various embodiments, a network communication system may include any number of intelligent electronic devices (IEDs) in a dual-ring communication network. Each IED may be programmed to handle data packets received on a first ring of the dual-ring communication network with higher priority and handle data packets received on a second ring of the dual-ring communication network with lower priority. An SDN controller may be used to program each IED to transmit high priority data packets in a first direction around the first ring of the dual-ring communication network via a first high priority data port.

Each of the IEDs may include a failure identification subsystem to identify a first link failure on the first ring of the dual-ring communication network that prevents an IED from receiving the high priority data packets in the first direction on the first ring of the dual-ring communication network. A flow path modification subsystem of the IED may implement a first level of redundancy by directing subsequent high priority data packets to the affected IED in a second direction on the first ring of the dual-ring communication network via a second high priority data port.

In various embodiments, the IED may include a packet inspection subsystem to identify and distinguish between high priority data packets and low priority data packets. In some embodiments, data packets may be distinguished based on the encapsulating protocol, packet headers, data type, or another distinguishing characteristic.

The IED may include low priority data ports to transmit data packets in first and second directions to first and second IEDs, respectively. The failure identification subsystem may further identify a second link failure on the first ring of the dual-ring communication network that prevents the effected IED from receiving high priority data packets in the second direction on the first ring of the dual-ring communication network. The flow path modification subsystem of the IED may address the second failure by modifying the flow path to implement a second level of redundancy. Specifically, the flow path modification subsystem of the IED may direct subsequent high priority data packets to the affected IED in the first direction on the second ring of the dual-ring communication network via a first of the low priority data ports.

If the failure identification subsystem of the IED detects a third link failure, such as a link failure on the second ring of the dual-ring communication network, then the flow path modification subsystem may implement a third level of redundancy. Specifically, the flow path modification system may direct subsequent high priority data packets to the affected IED in the second direction on the second ring of the dual-ring communication network via a second of the low priority data ports.

The phrases "connected to" and "in communication with" refer to any form of interaction between two or more components, including mechanical, electrical, magnetic, and electromagnetic interaction for data communication. Two components may be connected to each other, even though they are not in direct contact with each other, and even though there may be intermediary devices between the two components.

As used herein, the term "IED" may refer to any microprocessor-based device that monitors, controls, automates, and/or protects monitored equipment within a system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs may be connected to a network, and communication on the network may be facilitated by networking devices including, but not limited to, multiplexers, routers, hubs, gateways, firewalls, and switches. Furthermore, networking and communication devices may be incorporated in an IED or be in communication with an IED. The term "IED" may be used interchangeably to describe an individual IED or a system comprising multiple IEDs.

Some of the infrastructure that can be used with embodiments disclosed herein is already available, such as general-purpose computers, computer programming tools and techniques, digital storage media, virtual computers, virtual networking devices, and communications networks. A computer may include a processor, such as a microprocessor, microcontroller, logic circuitry, or the like. The processor may include a special purpose processing device, such as an ASIC, PAL, PLA, PLD, FPGA, or another customized or programmable device. The computer may also include a computer-readable storage device, such as non-volatile memory, static RAM, dynamic RAM, ROM, CD-ROM, disk, tape, magnetic, optical, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment.

The network may include communications or networking software, such as software available from any of a wide variety of companies, and may operate using a wide variety of known protocols over various types of physical network connections, such as twisted pair, coaxial, or optical fiber cables, telephone lines, satellites, microwave relays, modulated AC power lines, physical media transfer, wireless radio links, and/or other data transmission "wires." The network may encompass smaller networks and/or be connectable to other networks through a gateway or similar mechanism. Thus, it is appreciated that the systems and methods described herein are not limited to the specific network types described herein. Rather, any of a wide variety of network architectures may utilize the systems and methods described herein.

Aspects of certain embodiments described herein may be implemented as software modules or components. As used herein, a software module or component may include any type of computer instruction or computer-executable code located within or on a computer-readable storage medium. A software module may, for instance, comprise one or more physical or logical blocks of computer instructions, which may be organized as a routine, program, object, component, data structure, etc. that perform one or more tasks or implement particular abstract data types.

A particular software module may comprise disparate instructions stored in different locations of a computer-readable storage medium, which together implement the described functionality of the module. Indeed, a module may comprise a single instruction or many instructions and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In other instances, well-known structures, materials, or operations are not shown or described in detail to avoid obscuring aspects of this disclosure. In addition, the steps of a method do not necessarily need to be executed in any specific order, or even sequentially, nor need the steps be executed only once, unless otherwise specified.

FIG. 1 illustrates an embodiment of a simplified one-line diagram of an electric power transmission and distribution system 100 in which a plurality of communication devices and/or intelligent electronic devices (IEDs), such as IEDs 104, 106, 108, and 115, facilitate communication in a software-defined network (SDN) consistent with embodiments of the present disclosure. The electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, 136 and 158), circuit breakers (e.g., breakers 152, 160, 176), busses (e.g., busses 118, 126, 132, and 148), loads (e.g., loads 138 and 140) and the like. A variety of other types of equipment may also be included in the electric power delivery system 100, such as voltage regulators, capacitor banks, and a variety of other types of equipment.

A substation 119 may include a generator 114, which may be a distributed generator, and which may be connected to the bus 126 through the step-up transformer 117. The bus 126 may be connected to the distribution bus 132 via the step-down transformer 130. The various distribution lines 136 and 134 may be connected to the distribution bus 132. The distribution line 136 may lead to the substation 141 and the line 136 may be monitored and/or controlled using the IED 106, which may selectively open and close the breaker 152. The load 140 may be fed from the distribution line 136. A step-down transformer 144 in communication with the distribution bus 132 via the distribution line 136 may be used to step down a voltage for consumption by the load 140.

The distribution line 134 may lead to the substation 151 and deliver electric power to the bus 148. The bus 148 may also receive electric power from the distributed generator 116 via the transformer 150. The distribution line 158 may deliver electric power from the bus 148 to the load 138 and may include another step-down transformer 142. The circuit breaker 160 may be used to selectively connect the bus 148 to the distribution line 134. The IED 108 may be used to monitor and/or control the circuit breaker 160 as well as the distribution line 158.

The electric power delivery system 100 may be monitored, controlled, automated, and/or protected using IEDs, such as IEDs 104, 106, 108, and 115, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as the IEDs 104, 106, 108, and 115) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

According to various embodiments, IEDs may be in communication with other IEDs via the dual-ring network 181. For example, the IED 104 may communicate with the IED 108 via the dual-ring network 181 that passes through the IED 106. In another example, the IED 104 may communicate with the IED 108 via the dual-ring network 181 that (optionally) passes through a dedicated networking device 169 and IED 115. In some embodiments, IEDs may communicate with devices and/or systems not included in the dual-ring network 181. For example, an IED may communicate with an SDN controller 180, the central monitoring system 172, and/or other systems directly or via one or more dedicated networking devices 169.

A common time signal 168 may be distributed throughout system 100. Utilizing a common or universal time source may ensure that IEDs have a synchronized time signal that can be used to generate time-synchronized data, such as synchrophasors. In various embodiments, IEDs 104, 106, 108, and 115 may receive a common time signal 168. The common time signal 168 may be distributed in system 100 using a communications network 162 or using a common time source, such as a Global Navigation Satellite System (GNSS), or the like. The common time signal 168 may be distributed using, for example, PTP or NTP protocols.

According to various embodiments, the central monitoring system 172 may comprise one or more of a variety of types of systems. For example, the central monitoring system 172 may include a supervisory control and data acquisition (SCADA) system and/or a wide area control and situational awareness (WACSA) system.

Devices included in the dual-ring network 181 and devices and/or systems not included in the dual-ring network 181 may communicate via the dedicated networking devices 169. One or more of the dedicated networking devices 169 may receive the common time signal 168. Examples of a dedicated networking device include, but are not limited to, multiplexers, routers, hubs, gateways, firewalls, and switches. In some embodiments, the IEDs may comprise physically distinct devices. In other embodiments, the IEDs may be composite devices or may be configured in a variety of ways to perform overlapping functions. The IEDs may comprise multi-function hardware (e.g., processors, computer-readable storage media, communications interfaces, etc.) that can be utilized to perform a variety of tasks that pertain to network communications and/or the operation of equipment within system 100.

The SDN controller 180 may be configured to interface with one or more of the dedicated networking devices 169 and/or directly with IEDs 104, 106, 108, and 115. In some embodiments, the dedicated networking devices 169 may be omitted. The SDN controller 180 may facilitate the creation of an SDN within the network 162 that facilitates communication between various devices, including IEDs 104, 106, 108, and 115, and central monitoring system 172. In various embodiments, the SDN controller 180 may be configured to interface with a control plane (not shown) in the network 162. An operator may use the SDN controller 180 to define (e.g., program) network operation profiles of one or more of the IEDs 104, 106, 108, and 115 in the dual-ring network 181.

Figure 2:
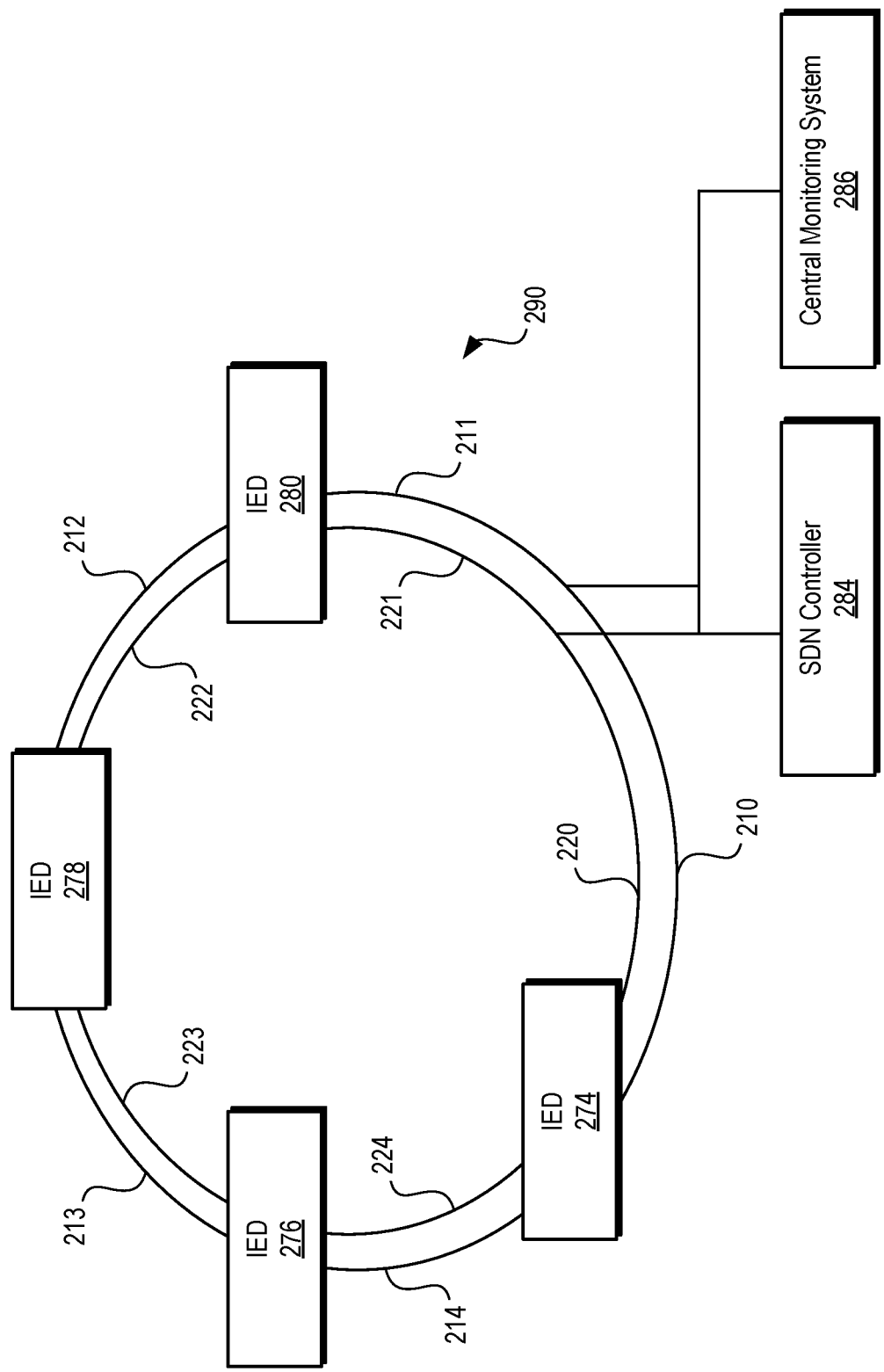
FIG. 2 illustrates an example block diagram of several intelligent electronic devices (IEDs) connected to a dual-ring network, as well as an SDN controller and a central monitoring system.

FIG. 2 illustrates an example block diagram of several IEDs 280, 278, 276, and 274 connected to a dual-ring network 290, as well as an SDN controller 284 and a central monitoring system 286. The SDN controller 284 may configure the IEDs 274-280 to operate within the dual-ring network 290.

The dual-ring network 290 includes an outer ring 210-214 and an inner ring 220-224. While some dual-ring implementations may be used for redundancy, the illustrated dual-ring network 290 provides a first communication path with directional redundancy for high priority communication and a second communication path with directional redundancy for low priority communications. In the event that both directions of the high priority communication ring are compromised, the low priority communication ring can be used as a backup ring for the high priority communications.

For example, each of the IEDs 274-280 may be configured or programmed to handle communications on the outer ring 210-214 with increased priority (e.g., high priority). In contrast, the IEDs 274-280 may be configured or programmed to handle communications on the inner ring 220-224 with decreased priority (e.g., low priority). For example, low priority data packets may be communicated to IED 280 via communication link 221, and high priority data packets may be communicated via communication link 211. IED 280 may facilitate communication with IED 278 by forwarding low priority data packets intended for IED 278 via communication link 222 and high priority data packets via communication link 212.

In some embodiments, high priority data packets may be communicated via the outer ring 210-214 in one direction (e.g., counterclockwise), and low priority data packets may be communicated via the inner ring 220-224 in the other direction (e.g., clockwise). In still other embodiments, a network flow path may be implemented with both high priority and low priority data packets transmitted in the same direction (e.g., clockwise). If one of the links fails, the network flow path may be modified to transmit the data packets in the opposite direction for the data packet to arrive at an intended IED.

A large number of IEDs may be configured as part of dual-ring network 290 with multiple communication links therebetween to form the dual-ring network 290. In the illustrated embodiment, the SDN controller 284 and the central monitoring system 286 are shown as separate systems. In other embodiments, the SDN controller 284 and central monitoring system 286 may be combined as part of a single device.

As illustrated, each IED may communicate with at least one other IED. For example, IED 278 may communicate with IED 280 or IED 276. Since the IEDs 274-280 are in the dual-ring topology, the IEDs 274-280 may not be instructed on its physical pathfinding and/or may not have spanning tree or other networking capabilities. Instead, each IED acts as a receiving IED when it receives a data packet. If the data packet received by the receiving IED is intended for the receiving IED, a responsive data packet is returned in the opposite direction from which the data packet was received. In contrast, if the data packet received by the receiving IED is intended for a different device (e.g., another IED), the receiving IED forwards the data packet along the dual-ring network 290. In other embodiments, a responsive data packet from a receiving IED may be transmitted around the ring in the same direction from which the data packet eliciting the responsive data packet was received.

For example, if IED 280 receives a data packet via communication link 211 or 221 that is not intended for IED 280, the data packet is forwarded along communication link 212 or 222. However, if IED 280 receives a data packet via communication link 211 or 221 that is intended for IED 280, then a responsive data packet may be returned in the opposite direction via communication link 211 or 221. Alternatively, the responsive data packet may be sent around the ring (e.g., 210-214 or 220-224) in the same direction until it arrives at an intended location.

The SDN controller 284 may program the IEDS 274-280 to quickly detect a failure within the dual-ring network 290. The dual-ring network 290 may utilize any of a wide variety of communication protocols (e.g., Ethernet, TCP/IP, GOOSE, etc.) to facilitate plug-and-play connections of IEDs and other devices. In some instances, the protocols may include integrated routines to detect unresponsive IEDs and/or communication link failures (e.g., timeout and/or dropout times). In other examples, the network may leverage SDN programming and packet inspection capabilities to detect flow path failure based on data packets that were expected to be received within a predefined time period that did not arrive. Examples of rapid, packet inspection-based link failure detection are described in a corresponding patent application titled "SDN Flow Path Modification based on Packet Inspection" filed about the same time as this application and having at least some common inventors. The above-identified patent application is hereby incorporated by reference in its entirety.

Figure 3A:
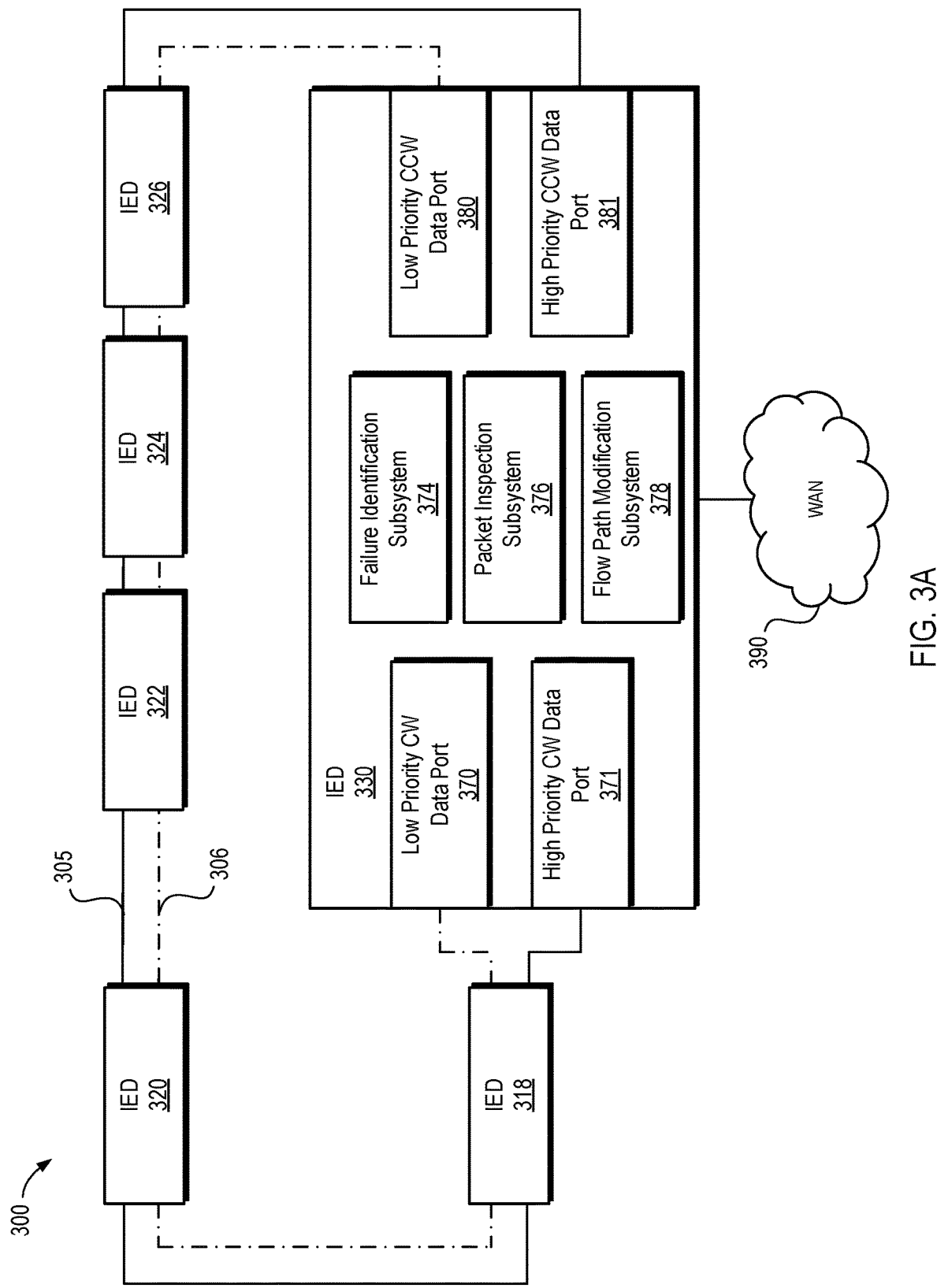
FIG. 3A illustrates an example block diagram of IEDs in a dual-ring network, according to one embodiment.

FIG. 3A illustrates an example block diagram of a dual-ring network 300 with an example IED 330 connected to various IEDs 318-326 via a low priority inner ring 306 (dashed lines) and a high priority outer ring 305 (solid lines). In some embodiments, the inner ring 306 and the outer ring 305 may be the same type of physical network. Each IED 318-326 may be configured or programmed to handle data packets received on the outer ring 305 with increased priority (high priority) relative to data packets received on the inner ring 306, which are handled with decreased priority (low priority).

In other embodiments, the outer ring 305 and the inner ring 306 may be different physical networks and/or utilize different communication protocols. For example, the outer ring 305 may be a physical network that facilitates high-speed and/or high-bandwidth communications, such as an optical network or copper Ethernet network. The outer ring 305 may utilize suitable data transmission protocols for high-speed and high priority data transmission, such as TCP/IP, UDP, PRP, sampled values, and/or GOOSE protocols. The inner ring 306 may, for example, be a legacy physical network and/or utilize legacy communication protocols that offer slower network speeds and/or limited bandwidth.

Each of the IEDs 318-326 may include the blocks 370-381 that are described in the context of IED 330. That is, any of the IEDs 318-326 may include SDN functionality and therefore be considered an "SDN device" or "SDN IED" as opposed to an IED that does not necessarily have SDN functionality and programmability. Accordingly, as used herein, the broader term "IED" encompasses IEDs that do not have SDN functionality or programmability and IEDs that do have SDN functionality and are programmable to implement SDN functions (SDN devices). In the illustrated embodiment, the IED 330 is an SDN device. The other IEDs 318-326 may or may not be SDN devices and may or may not include the same functionality as IED 330. In some embodiments, all of the IEDs 318-330 include the functionalities described in conjunction with IED 330.

As illustrated, the IED 330 is connected to a wide area network 390 and may receive data packets therefrom. In some embodiments, a different one of the IEDs 318-326 may be connected to the wide-area network 390 or more than one of the IEDs 318-326 may be connected to the wide-area network 390. In some embodiments, data packets from the wide-area network 390 may have headers or otherwise be identified as priority data packets. The packet inspection subsystem 376 of the IED 330 may identify the high priority data packets and transmit them on the outer ring 305 for increased priority to an intended IED. In other embodiments, the packet inspection subsystem 376 of the IED 330 may perform a deep packet inspection on data packets from the wide-area network 390 to identify priority data packets for transmission on the outer ring 305. In contrast, low priority data packets may be transmitted on the inner ring 306.

The IED 330 may transmit high priority data packets to IEDs 318, 320, and 322 in a clockwise direction via high priority CW data port 371. The IED 330 may transmit high priority data packets to IEDs 324 and 326 in a counterclockwise direction via high priority CCW data port 381.

Figure 3B:
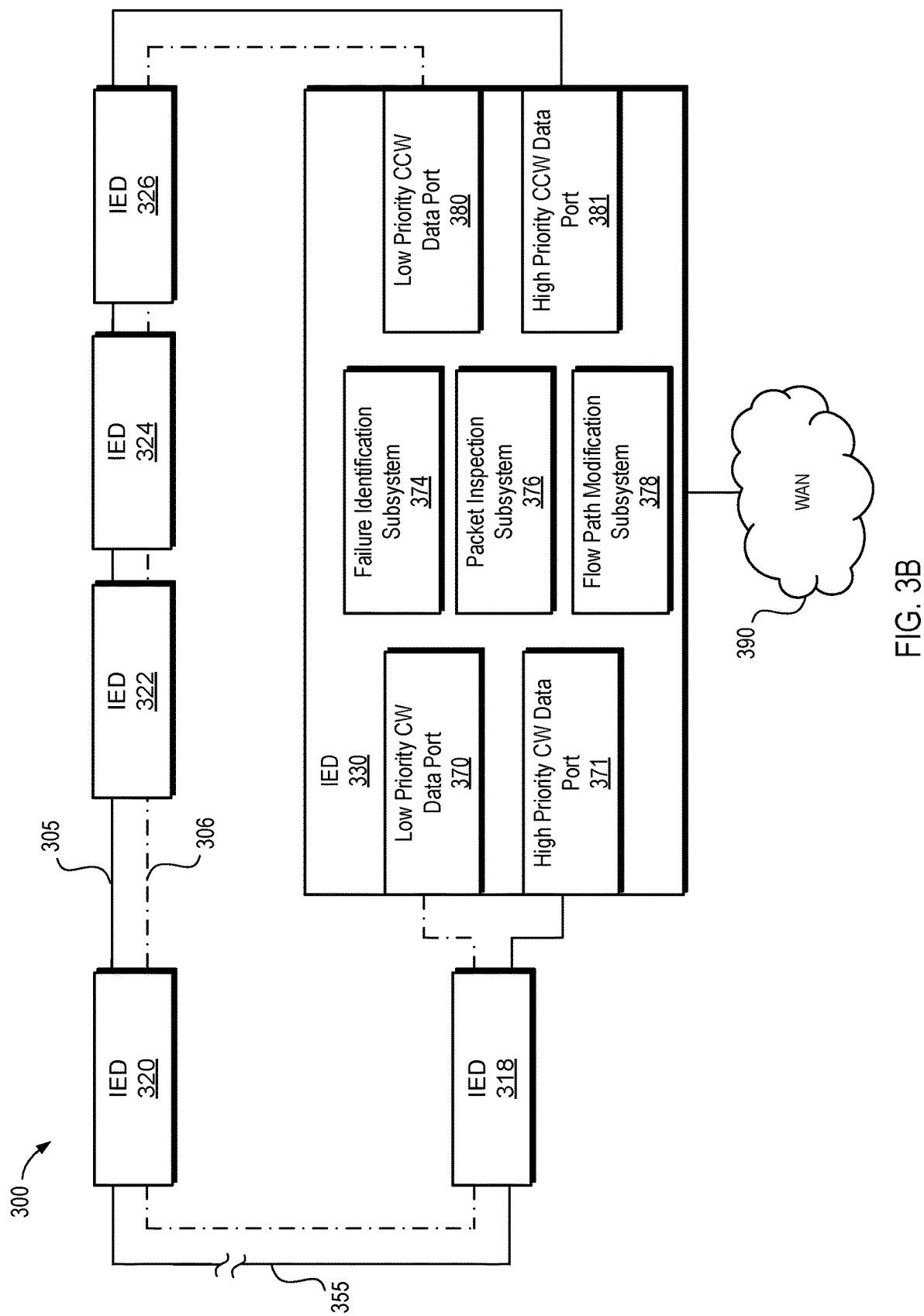
FIG. 3B illustrates an example block diagram of IEDs in the dual-ring network with a first link failure, according to one embodiment.

FIG. 3B illustrates a first level of redundancy (directional redundancy) implemented by the IED 330 in the example dual-ring network 300 of FIG. 3A. A failure identification subsystem 374 may identify a failure of link 355 between IEDs 318 and 320, and the flow path modification subsystem 378 may modify the network flow path. For example, the flow path modification subsystem 378 of the IED 330 may modify the network flow path to transmit data packets intended for IEDs 320 and 322 in a counterclockwise direction via the high priority CCW data port 381. Accordingly, the IED 330 implements a first level of redundancy as directional redundancy on the outer ring 305 by modifying the direction of network flow for high priority data packets.

Figure 3C:
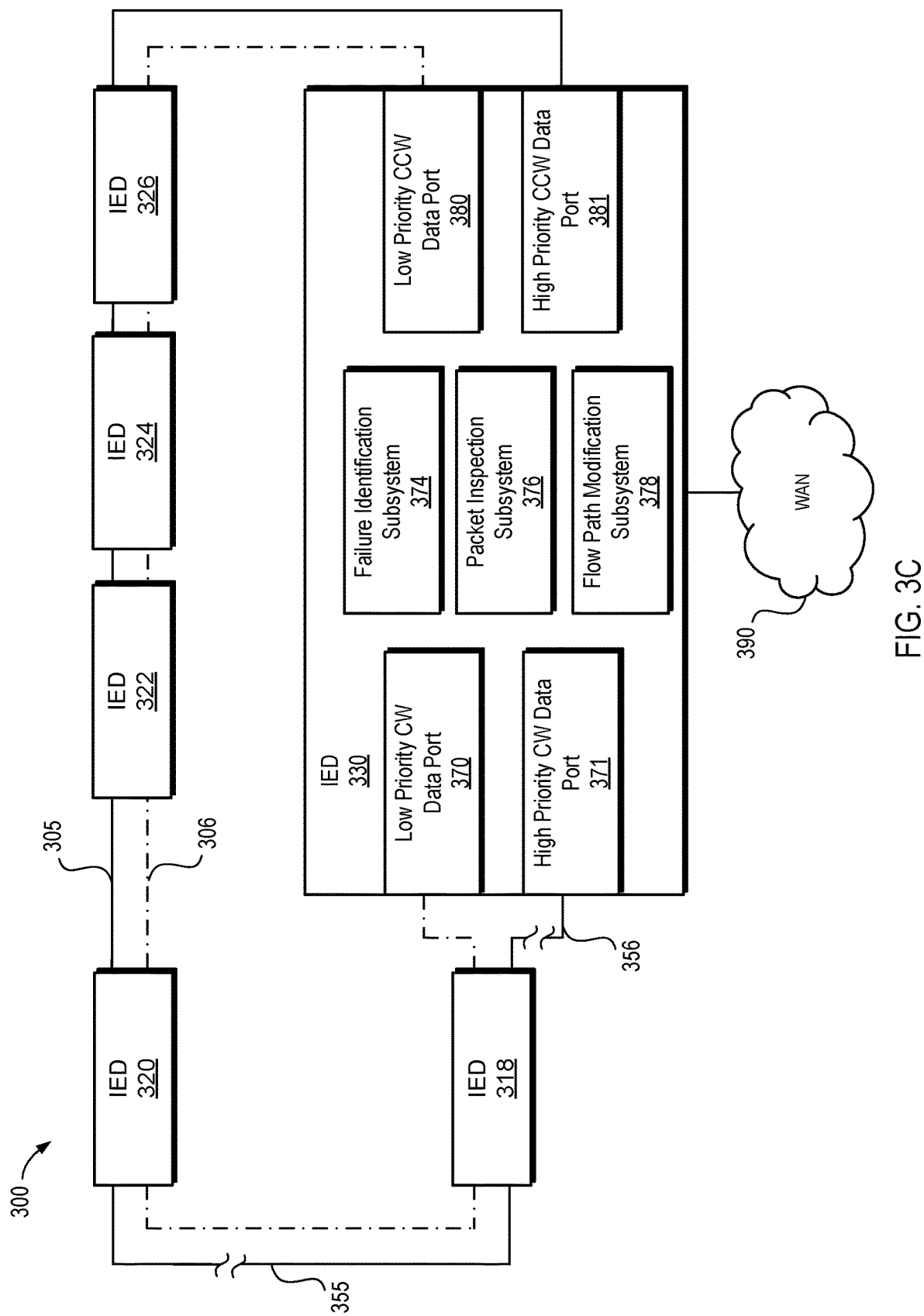
FIG. 3C illustrates an example block diagram of IEDs in the dual-ring network with a second link failure, according to one embodiment.

FIG. 3C illustrates a second level of redundancy (ring redundancy) implemented by the IED 330 in the example dual-ring network 300 of FIGS. 3A and 3B. The failure identification subsystem 374 may identify the failure of link 355, resulting in a network flow modification implemented as directional redundancy (as discussed in conjunction with FIG. 3B). Subsequently, the IED 330 may identify a second failure in the link 356 that renders the IED 318 disconnected from the outer ring 305 of the dual-ring network 300. The IED 330 may modify the network flow, based on the two failures on the outer ring 305, to transmit high priority data packets (as identified by packet inspection subsystem 376) intended for IED 318 on the inner ring 306 normally used for lower priority communications.

In some implementations, the inner ring 306 may not implement the same communication protocol as the outer ring 305. Accordingly, the IED 330 may convert the data packet intended for transmission on the outer ring 305 via a first communication protocol to a data packet suitable for transmission on the inner ring 306 via a second communication protocol. In some embodiments, the data packet transmitted on the inner ring 306 normally used for low priority communications may be marked or identified (e.g., in a packet header) as a high priority data packet. The IED 318 may receive the high priority data packet via the inner ring 306 and identify the received data packet as a high priority data packet.

Figure 3D:
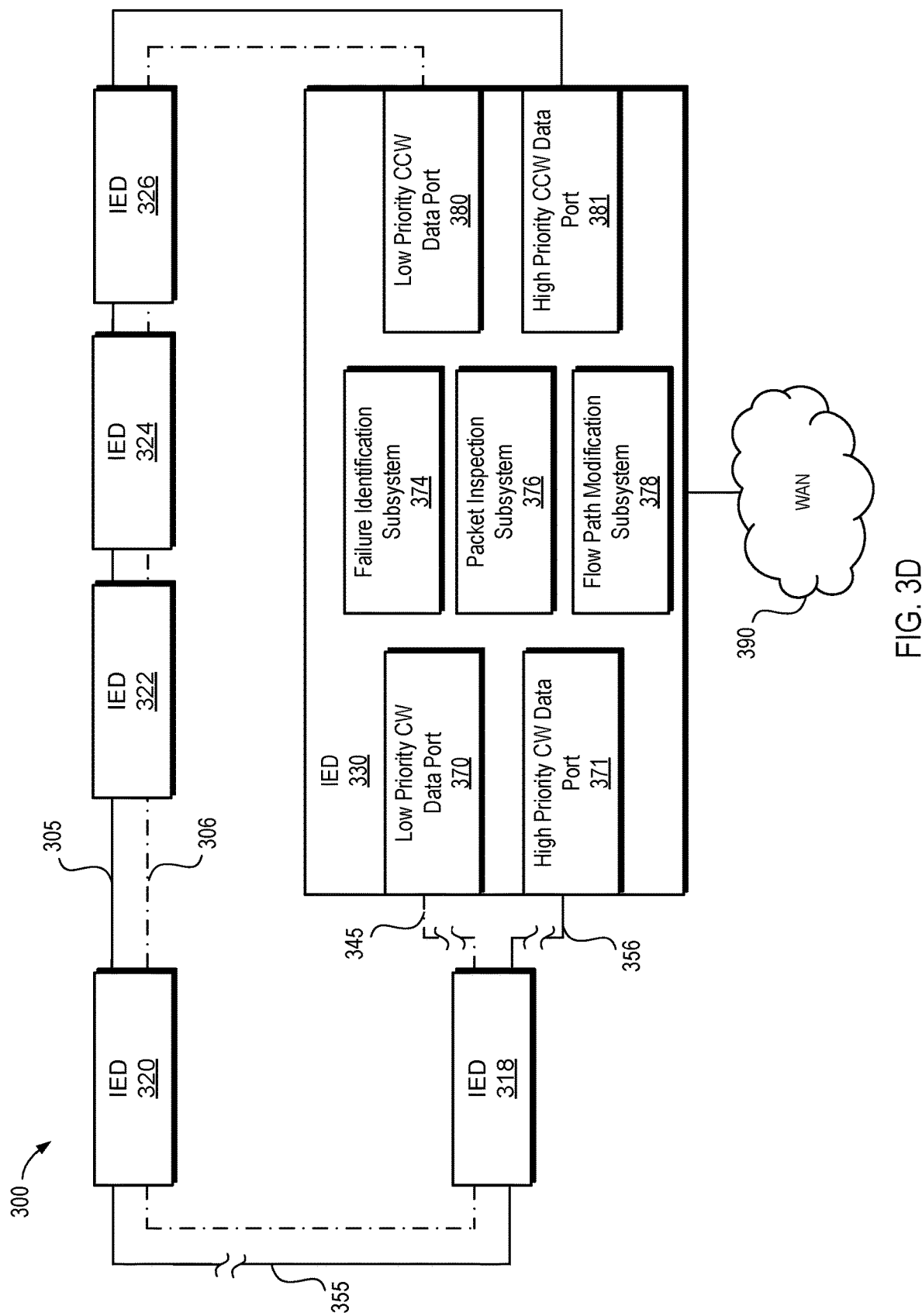
FIG. 3D illustrates an example block diagram of IEDs in the dual-ring network with a third link failure, according to one embodiment.

FIG. 3D illustrates the IED 330 implementing a third level of low priority redundancy (low priority directional redundancy) due to a third failure on the low priority communication link 345. The flow path modification subsystem 378 of the IED 330 modifies the flow path to transmit both low priority data packets and high priority data packets to the IED 318 via the low priority inner ring 306 in a counterclockwise direction via the low priority CCW data port 380 due to the various failures in links 345, 355, and 356 in the dual-ring network 300.

According to various embodiments, an IED, such as the example IED 330 described in conjunction with FIGS. 3A-3D, may activate an alarm or transmit a notification to a supervisory system or technician when a failure is detected. As described herein, the IEDs 318-330 may implement various levels of redundancy to self-heal or otherwise modify the network flow path until the failure is fixed. A link failure, as used and described herein, may be caused by, for example, a physical failure of the communication network between two IEDs in the dual-ring network or a failure of a network card or data port of one of the IEDs.

In other examples, the link failure may apply to one protocol, but not other protocols. For instance, a failure in link 355 in FIG. 3B may be based on the failure identification subsystem 374 detecting that sampled values transmitted clockwise via high priority CW data port 371 are not being received by IED 320. However, IED 320 may still be receiving GOOSE communications transmitted clockwise via high priority CW data port 371. The IED 330 may self-heal the network flow path by transmitting sampled values to and from IED 320 in the other (counterclockwise) direction via high priority CCW data port 381. However, GOOSE communications may continue to be handled via the high priority CW data port 371 in the clockwise direction.

Figure 4:
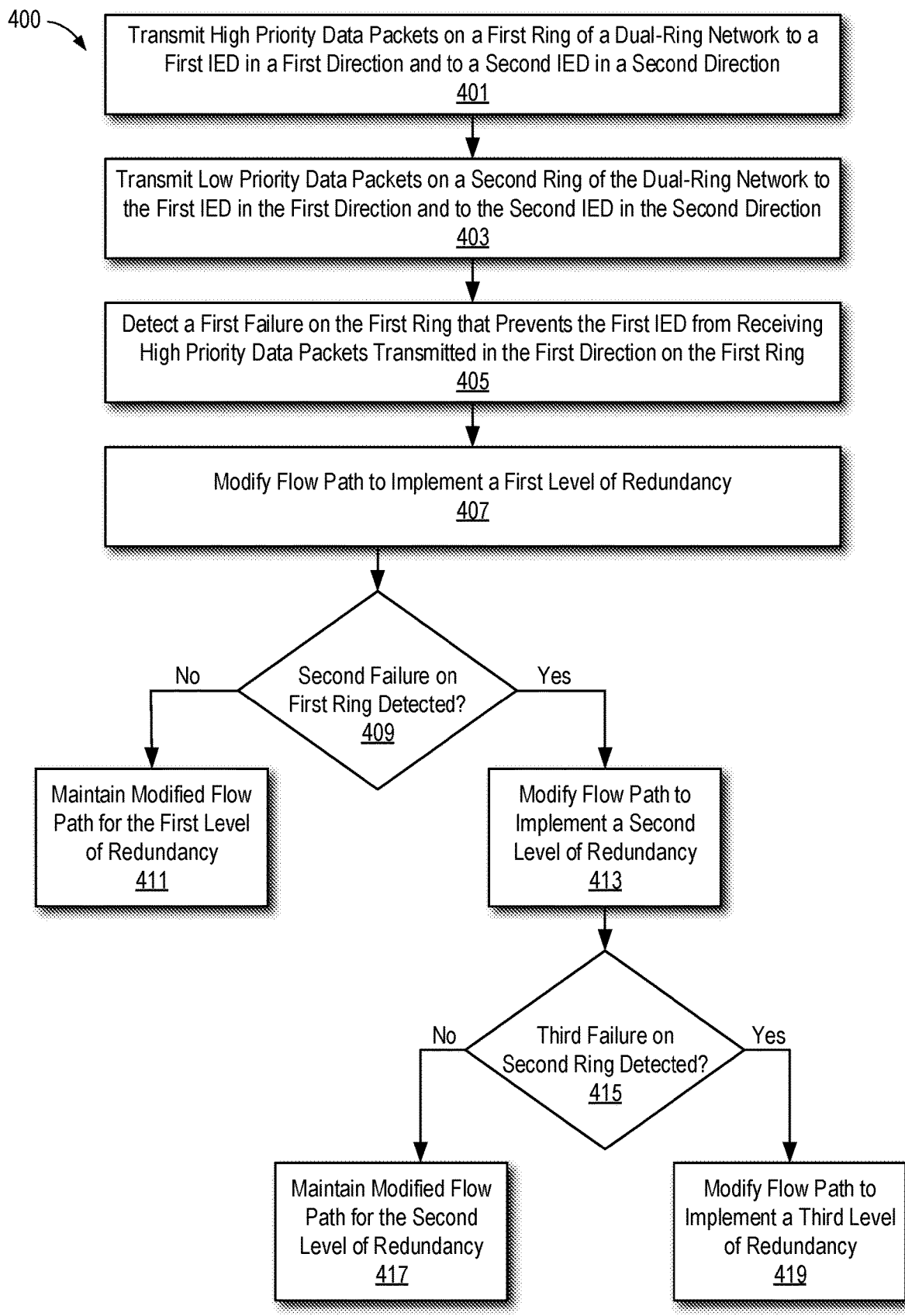
FIG. 4 illustrates a flow chart of an example method for implementing various levels of redundancy in a dual-ring network, according to one embodiment.

FIG. 4 illustrates a flow chart 400 of an example method for modifying a flow path in a dual-ring network with a high priority ring and a low priority ring based on link failures. An IED may transmit, at 401, high priority data packets on a first ring of a dual-ring network. Data packets may be transmitted in a first direction to some IEDs and in a second direction to other IEDs. The IED may also control, at 403, the network flow of low priority data packets on a second ring of the dual-ring network. Again, low priority data packets may be transmitted to a first IED in the first direction and to a second IED in the second direction.

The IED may detect a first failure, at 405, on the first ring that prevents the first IED from receiving high priority data packets transmitted in the first direction on the first ring. The IED may modify, at 407, the flow path to implement a first level of redundancy. For example, a flow path modification subsystem of the IED may modify the flow path of subsequent high priority data packets for one or more IEDs in the opposite direction from the default flow direction.

If the IED detects, at 409, a second failure on the first ring, then the IED may further modify, at 413, the flow path to implement a second level of redundancy. The second level of redundancy may include modifying the flow path of subsequent high priority data packets for transmission in a first direction to one or more IEDs on the second ring of the dual-ring network that is normally used for the low priority data packets. If no additional failures are detected, at 409, then the existing flow plan may be maintained with the first level of redundancy, at 411.

If a third failure is detected, at 415, then the IED may modify, at 419, a flow path to implement a third level of redundancy. For example, the IED may transmit subsequent high priority data packets in a second direction to the one or more IEDs on the second ring of the dual-ring network that is normally used for low priority data packets. If a third failure is not detected (i.e., only the first and second failures persist), the IED may maintain, at 417, the flow path with some high priority data packets being transmitted on the second, low priority ring of the dual-ring network until the first, high priority ring is fixed.

The methods disclosed herein include one or more elements or actions for performing the described method. The method elements and/or actions may be interchanged with one another. In other words, unless a specific order of elements or actions is required for proper operation of the embodiment, the order and/or use of specific elements and/or actions may be modified and/or elements or actions may be omitted.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations. Thus, all feasible permutations and combinations of embodiments are contemplated.

Several aspects of the embodiments described may be implemented using hardware, firmware and/or software modules or components. As used herein, a module or component may include various hardware components, firmware code, and/or any type of computer instruction or computer-executable code located within a memory device and/or transmitted as transitory or nontransitory electronic signals over a system bus or wired or wireless network. Many of the embodiments described herein are shown in block diagram form and/or using logic symbols. It is appreciated that various elements of each of the illustrated and described embodiments could be implemented using FPGAs, custom ASICs, and/or as hardware/software combinations.

In the description above, various features are sometimes grouped in a single embodiment, figure, or description thereof to streamline this disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure also includes all permutations and combinations of the independent claims with their dependent claims.

What is claimed is:

1. A network communication system, comprising:
   intelligent electronic devices (IEDs);
   a dual-ring communication network to communicatively connect the IEDs in a dual ring topology, wherein each IED is programmed to handle data packets received on a first ring of the dual-ring communication network with higher priority and handle data packets received on a second ring of the dual-ring communication network with lower priority; and
   a software-defined network (SDN) device connected to the dual-ring network that includes:
      a first high priority data port to transmit high priority data packets to a first of the IEDs in a first direction around the first ring of the dual-ring communication network;
      a failure identification subsystem to identify a first link failure on the first ring of the dual-ring communication network that prevents the first IED from receiving the high priority data packets in the first direction on the first ring of the dual-ring communication network; and
      a flow path modification subsystem to implement a first level of redundancy by directing subsequent high priority data packets to the first IED in a second direction on the first ring of the dual-ring communication network.

2. The system of claim 1, wherein the SDN device comprises a packet inspection subsystem to identify high priority data packets.

3. The system of claim 1, wherein the SDN device comprises a second high priority data port to transmit the subsequent high priority data packets to the first IED in the second direction around the first ring of the dual-ring communication network.

4. The system of claim 1, wherein the SDN device further comprises a first low priority data port to transmit low priority data packets to the first IED in a first direction on a second ring of the dual-ring communication network,
   wherein the failure identification subsystem is further configured to identify a second link failure on the first ring of the dual-ring communication network that prevents the first IED from receiving the high priority data packets in the second direction on the first ring of the dual-ring communication network, and
   wherein the flow path modification subsystem is further configured to implement a second level of redundancy by directing subsequent high priority data packets to the first IED in the first direction on the second ring of the dual-ring communication network via the first low priority data port.

5. The system of claim 4, wherein the SDN device further comprises a second low priority data port to transmit low priority data packets in a second direction on the second ring of the dual-ring communication network,
   wherein the failure identification subsystem is further configured to identify a third link failure on the second ring of the dual-ring communication network that prevents the first IED from receiving the high priority data packets in the first direction on the second ring of the dual-ring communication network, and
   wherein the flow path modification subsystem is further configured to implement a third level of redundancy by directing subsequent high priority data packets to the first IED in the second direction on the second ring of the dual-ring communication network via the second low priority data port.

6. A network communication system, comprising:
   intelligent electronic devices (IEDs);
   a dual-ring communication network to communicatively connect the IEDs in a dual ring topology with a high priority first ring and a low priority second ring; and
   a software-defined network (SDN) device connected to the dual-ring network that includes:
      a first high priority data port to transmit high priority data packets to a first of the IEDs in a first direction around the first ring;
      a second high priority data port to transmit high priority data packets to a second of the IEDs in a second direction around the first ring;
      a first low priority data port to transmit low priority data packets to the first IED in the first direction around a second ring;
      a second low priority data port to transmit low priority data packets to the second IED in the second direction around the second ring;
      a failure identification subsystem to identify link failures in the first and second rings; and
      a flow path modification subsystem to implement:
         a first level of directional redundancy in the event of a first link failure on the first ring by modifying a flow path of subsequent high priority data packets for transmission to the first IED on the first ring in the second direction; and
         a second level of ring redundancy in the event of a second link failure on the first ring by modifying the flow path of subsequent high priority data packets for transmission to the first IED on the second ring in the first direction.

7. The system of claim 6, wherein the first ring comprises a fiber optic communications network and the second ring comprises a copper communications network.

8. The system of claim 6, wherein the first ring utilizes at least one of sampled values and GOOSE protocols, and wherein the second ring utilizes TCP/IP protocols.

9. The system of claim 6, wherein each of the IEDs is programmed to prioritize data packets received on the first ring.

10. The system of claim 6, wherein the flow path modification subsystem is further configured to implement a third level of directional redundancy on the second ring in the event of a third link failure on the second ring by modifying the flow path of subsequent high priority data packets for transmission to the first IED on the second ring in the second direction.

11. A method comprising:
transmitting high priority data packets to a first intelligent electronic device (IED) in a first direction on a first ring of a dual-ring network;
transmitting high priority data packets to a second IED in a second direction on the first ring;
transmitting low priority data packets to the first IED in the first direction on a second ring of the dual-ring network;
transmitting low priority data packets to the second IED in the second direction on the second ring;
detecting a first failure on the first ring preventing the first IED from receiving high priority data packets transmitted in the first direction on the first ring; and
transmitting subsequent high priority data packets to the first IED in the second direction on the first ring in response to the detected first failure.

12. The method of claim 11, further comprising:
detecting a second failure on the first ring preventing the first IED from receiving high priority data packets transmitted in the second direction on the first ring; and
transmitting subsequent high-priority data packets to the first IED in the first direction on the second ring in response to the detected second failure.

13. The method of claim 12, further comprising:
detecting a third failure on the second ring preventing the first IED from receiving high priority data packets transmitted in the first direction on the second ring; and
transmitting subsequent high-priority data packets to the first IED in the second direction on the second ring in response to the detected third failure.

14. The method of claim 11, wherein the first and second rings of the dual-ring network comprise the same physical network types.

15. The method of claim 14, wherein the first ring utilizes a first communication protocol and the second ring utilizes a second communication protocol, and wherein transmitting the high-priority data packets on the second ring comprises converting the high priority data packets from the first communication protocol to the second communication protocol.

16. The method of claim 11, wherein the first ring utilizes a first communication protocol selected from one of: a PGP communication protocol, a sampled values communication protocol, and a GOOSE communication protocol.

17. The method of claim 16, wherein the second ring utilizes a second communication protocol that is different than the first communication protocol.

18. The method of claim 17, wherein the second communication protocol is selected from one of: a PGP communication protocol, a sampled values communication protocol, and a GOOSE communication protocol.

19. The method of claim 11, wherein each of the first and second rings of the dual-ring network comprises a wired, Ethernet communication network.

20. A method comprising:
transmitting high priority data packets to a first intelligent electronic device (IED) in a first direction on a first ring of a dual-ring network selectively using a first communication protocol and a second communication protocol;
transmitting high priority data packets to a second IED in a second direction on the first ring selectively using the first communication protocol and the second communication protocol;
transmitting low priority data packets to the first IED in the first direction on a second ring of the dual-ring network;
transmitting low priority data packets to the second IED in the second direction on the second ring;
detecting a first failure on the first ring preventing the first IED from receiving high priority data packets transmitted in the first direction on the first ring using the first communication protocol; and
implementing, in response to the detected first failure, a protocol-specific first level of directional redundancy by:
continuing to transmit high priority data packets using the second communication protocol to the first IED in the first direction on the first ring, and
transmitting subsequent high priority data packets using the first communication protocol to the first IED in the second direction on the first ring.

* * * * *